US010511180B2

(12) United States Patent
Oikarinen et al.

(10) Patent No.: US 10,511,180 B2
(45) Date of Patent: Dec. 17, 2019

(54) SYSTEMS AND METHODS FOR REUSE OF BATTERY PACK-SIDE CURRENT AND VOLTAGE SENSING

(71) Applicant: QUALCOMM Incorporated, San Diego, CA (US)

(72) Inventors: Juha Oikarinen, San Jose, CA (US); Christian Gregory Sporck, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 15/380,225

(22) Filed: Dec. 15, 2016

(65) Prior Publication Data

US 2018/0175641 A1 Jun. 21, 2018

(51) Int. Cl.
*H02J 7/00* (2006.01)
*H01M 10/42* (2006.01)
*H01M 10/48* (2006.01)

(52) U.S. Cl.
CPC ......... *H02J 7/0026* (2013.01); *H01M 10/425* (2013.01); *H01M 10/48* (2013.01); *H02J 7/007* (2013.01); *H02J 7/0044* (2013.01); *H01M 10/486* (2013.01); *H01M 2010/4271* (2013.01); *H01M 2220/30* (2013.01)

(58) Field of Classification Search
CPC .......................... H02J 7/0026; H01M 2200/00
USPC ....................................................... 320/112
See application file for complete search history.

(56) References Cited

U.S. PATENT DOCUMENTS

| 5,977,751 | A  | 11/1999 | Blessing et al. |
| 6,407,534 | B1 | 6/2002  | Mukainakano |
| 8,898,491 | B2 | 11/2014 | Huynh |
| 9,026,387 | B2 | 5/2015  | Vilhauer et al. |
| 9,112,363 | B2 | 8/2015  | Partovi |
| 2005/0134227 | A1 | 6/2005 | Wozniak |
| 2006/0087286 | A1 | 4/2006 | Phillips et al. |
| 2009/0167252 | A1 | 7/2009 | Abe |
| 2009/0179650 | A1 | 7/2009 | Omagari |
| 2013/0045404 | A1 | 2/2013 | Shi |

(Continued)

FOREIGN PATENT DOCUMENTS

EP 2058915 A2 5/2009

OTHER PUBLICATIONS

International Search Report and Written Opinion for PCT/US2017/065759, dated Mar. 6, 2018, 16 pages.

(Continued)

*Primary Examiner* — Richard V Muralidar
(74) *Attorney, Agent, or Firm* — Withrow & Terranova, PLLC -

(57) ABSTRACT

Systems and methods for reuse of battery pack-side current and voltage sensing are disclosed. By reusing elements within a battery pack, a battery field effect transistor (FET) within a power management integrated circuit (PMIC) may be eliminated or at least bypassed. In a first aspect, a current mirror is coupled to a charge protection circuit in the battery pack to capture a sensed current. Likewise, a voltage sensor captures a voltage level for a charging path. Current and voltage are output to the PMIC for use in regulating a buck charger. In a second aspect, current data and voltage data are collected and digitized before being sent to the PMIC for use in regulating the buck charger.

13 Claims, 6 Drawing Sheets

(56) References Cited

U.S. PATENT DOCUMENTS

| | | | |
|---|---|---|---|
| 2013/0200847 A1* | 8/2013 | Kurokawa | H02J 7/0031 320/112 |
| 2014/0068310 A1* | 3/2014 | Sultenfuss | G06F 1/28 713/340 |
| 2015/0256011 A1* | 9/2015 | Shi | H01M 10/425 429/61 |
| 2016/0156214 A1 | 6/2016 | Yoon et al. | |
| 2016/0233714 A1 | 8/2016 | Lo et al. | |
| 2016/0254688 A1 | 9/2016 | Jung et al. | |

OTHER PUBLICATIONS

Second Written Opinion for PCT/US2017/065759, dated Nov. 19, 2018, 8 pages.

International Preliminary Report on Patentability for PCT/US2017/065759, dated Feb. 12, 2019, 24 pages.

* cited by examiner

SYSTEMS AND METHODS FOR REUSE OF BATTERY PACK-SIDE CURRENT AND VOLTAGE SENSING

BACKGROUND

I. Field of the Disclosure

The technology of the disclosure relates generally to controlling battery charging in mobile computing devices.

II. Background

Mobile computing devices have become increasingly common throughout society. The proliferation of such mobile computing devices is fueled in part by increased processing power that enables increased functionality. Such increased processing power is offset in part by the increased power consumption that such functionality requires. Concurrent with the increased functionality, advances have been made in batteries such that the time that passes before a battery needs to be recharged has been extended (sometimes referred to as battery run time). Likewise, the time required to charge a battery has been reduced.

There are generally two components used in charging a battery. The first component is a battery pack, which may include, in addition to the actual battery, charge protection circuitry and a temperature sensor. The second component is a power management integrated circuit (PMIC), which may include a buck charging circuit, a charge controller, and a battery field effect transistor (FET) that acts as a fuel gauge.

While significant advances have been made in battery run times and charging times, pressure remains to reduce the cost, size, and impedance in battery charging circuitry.

SUMMARY OF THE DISCLOSURE

Aspects disclosed in the detailed description include systems and methods for reuse of battery pack-side current and voltage sensing. By reusing elements within a battery pack, a battery field effect transistor (FET) within a power management integrated circuit (PMIC) may be eliminated or at least bypassed. Removal of the battery FET in the PMIC from a charging path substantially reduces impedance, which promotes power savings. Elimination of the battery FET from the PMIC allows for space savings commensurate with the relatively large size of the battery FET as well as cost savings. In a first aspect, a current mirror is coupled to a charge protection circuit in the battery pack to capture a sensed current. Likewise, a voltage sensor captures a voltage level for the charging path. Current and voltage are output to the PMIC for use in regulating a buck charger. In a second aspect, current data and voltage data are collected and digitized before being sent to the PMIC for use in regulating the buck charger.

In this regard in one aspect, a battery pack is disclosed. The battery pack includes a battery cell. The battery pack also includes a protection circuit. The protection circuit includes a first FET and a second FET arranged back-to-back. The battery pack also includes a current mirror associated with the first FET and the second FET. The current mirror is configured to provide information about current flowing to the battery cell. The battery pack also includes a voltage sense circuit. The battery pack also includes a batter connector. The battery connector is configured to couple to a power bus and convey information from the voltage sense circuit and the information about the current flowing to the battery cell to a remote PMIC across the power bus.

In another aspect, a PMIC is disclosed. The PMIC includes a power source input. The PMIC also includes a buck charger circuit coupled to the power source input and having a buck output. The PMIC also includes a power output coupled to the buck output. The PMIC also includes a feedback input configured to receive information from a battery pack. The information includes data from a voltage sense circuit in the battery pack and information about current flowing to a battery cell in the battery pack.

In another aspect, a method for controlling battery charging is disclosed. The method includes sensing current within a battery pack associated with a battery cell. The method also includes sensing voltage within the battery pack. The method also includes reporting information related to the current and the voltage to a separate PMIC.

In another aspect, a method for controlling charging of a battery at a PMIC is disclosed. The method includes receiving, from a battery pack, information relating to current and voltage passing to a battery cell within the battery pack. The method also includes controlling a buck charger circuit based on the information.

DETAILED DESCRIPTION

Figure 1A:
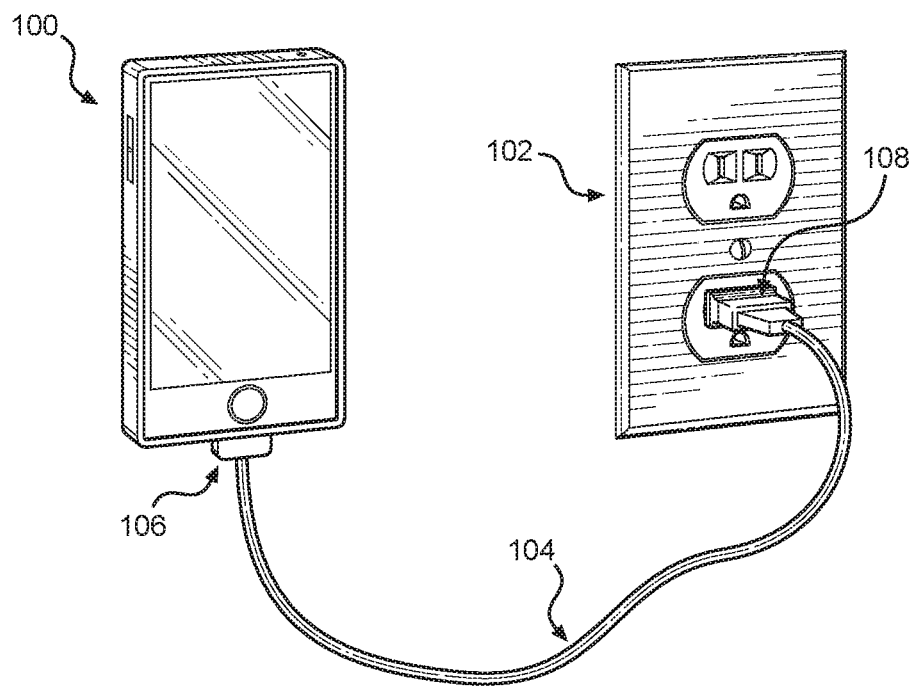
FIG. 1A is a simplified illustration of a mobile computing device plugged into a wall outlet that may benefit from exemplary aspects of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for reuse of battery pack-side current and voltage sensing. By reusing elements within a battery pack, a battery field effect transistor (FET) within a power management integrated circuit (PMIC) may be eliminated or at least bypassed. Removal of the battery FET in the PMIC from a charging path substantially reduces impedance, which promotes power savings. Elimination of the battery FET from the PMIC allows for space savings commensurate with the relatively large size of the battery FET as well as cost savings. In a first aspect, a current mirror is coupled to a charge protection circuit in the battery pack to capture a sensed current. Likewise, a voltage sensor captures a voltage level for the charging path. Current and voltage are output to the PMIC for use in regulating a buck charger. In a second aspect, current data and voltage data are collected and digitized before being sent to the PMIC for use in regulating the buck charger.

Figure 1B:
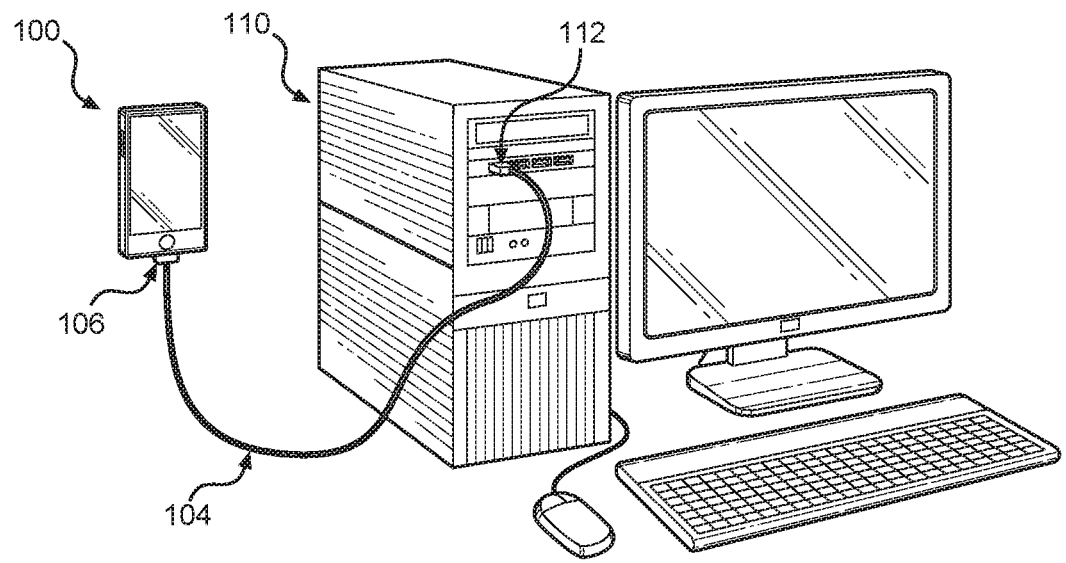
FIG. 1B is a simplified illustration of a mobile computing device plugged into a Universal Serial Bus (USB) port of a second computing device that may likewise benefit from exemplary aspects of the present disclosure.

Before addressing particulars of the present disclosure, a brief overview of a few situations that may benefit from aspects of the present disclosure are provided with reference to FIGS. 1A and 1B. A high-level introduction to exemplary aspects of reuse of battery pack-side current and voltage sensing begins below with reference to FIG. 2 with more details provided in the following paragraphs.

In this regard, FIG. 1A is a simplified illustration of a mobile computing device 100 plugged into a wall outlet 102 to charge a battery cell (not shown) in the mobile computing device 100. In particular, a cable 104 includes a connector 106 that plugs into a receptacle in the housing of the mobile computing device 100. The other end of the cable 104 includes a transformer block 108 configured to modify voltage and current from the wall outlet 102 to acceptable levels and format for the mobile computing device 100. While shown as a mobile or smart phone, it should be appreciated that other mobile computing devices that primarily rely on battery power may likewise still be a mobile computing device 100. In an exemplary aspect, the cable 104 is a Universal Serial Bus (USB) compliant cable. The connector 106 may likewise conform to one of the standard USB form factors or may be proprietary (e.g., APPLE LIGHTNING) without departing from the scope of the present disclosure.

Batteries for mobile computing devices such as the mobile computing device 100 may also be recharged from other computing devices as illustrated in FIG. 1B, where the mobile computing device 100 is being recharged through the cable 104 from a desktop computer 110. In particular, the cable 104 may be plugged into a receptacle 112, such as a USB port, and power provided therethrough to the mobile computing device 100. It should be appreciated that other recharging options may also exist for mobile computing devices including wireless recharging stations such as those sold by BELKIN, charging from a secondary battery pack such as those sold by MOPHIE and TZUMI, other mobile computing devices, or the like.

Figure 2:
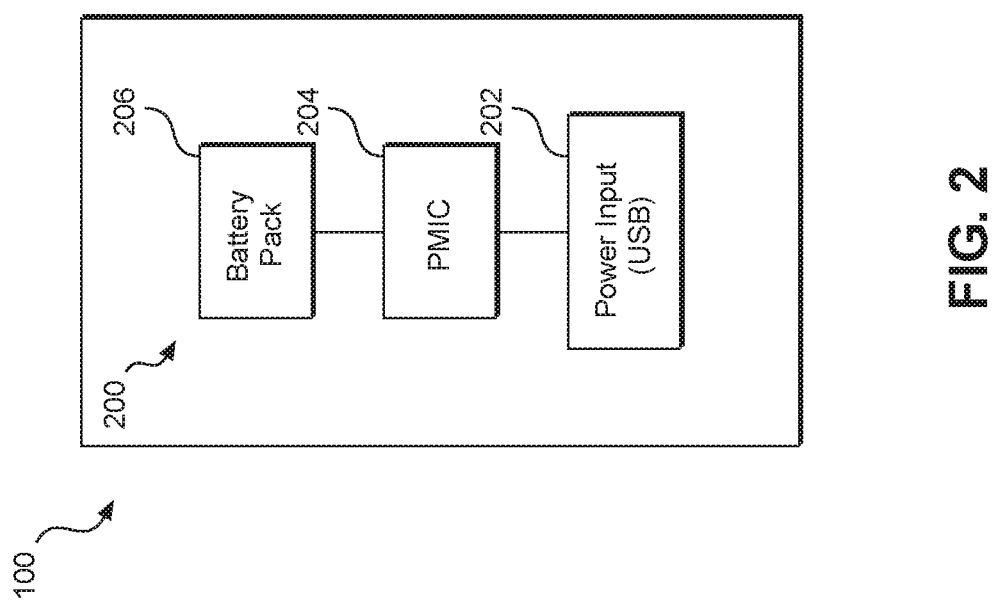
FIG. 2 is a simplified block diagram of battery charging components within a mobile computing device such as the mobile computing device of FIGS. 1A and 1B.

Regardless of how the power is provided to the mobile computing device 100, FIG. 2 provides a high-level block diagram of a power circuit 200 of the mobile computing device 100. In particular, the power circuit 200 includes a power input 202, which may be a USB receptacle, a proprietary receptacle, or the like. The power input 202 takes power from a power pin in the cable 104 of FIGS. 1A and 1B and provides this power to a PMIC 204. The PMIC 204 in turn provides a conditioned power signal to a battery pack 206 that contains a battery cell (not illustrated).

In conventional systems, not illustrated specifically, the PMIC would have a battery field effect transistor (FET) that would be used to help isolate the battery pack from voltage and/or current spikes as well as sense current flowing to the battery pack. This battery FET consumes relatively large amounts of space and raises the cost of the PMIC. Still further, the use of such a battery FET adds series resistance to the power circuit. This additional resistance consumes power, thereby reducing battery life and causing heat generation within the power circuit Exemplary aspects of the present disclosure allow for the functions of the battery FET to be provided by circuitry in the battery pack 206. Reuse of circuitry in the battery pack 206 to provide voltage and current sensing as well as circuit protection allows for removal of the battery FET from a power path from the power input 202 to the battery cell. In a first exemplary aspect, the battery FET is switchably connected to the power path. When the battery pack 206 is used according to exemplary aspects of the present disclosure, the battery FET is not needed and switched out of the power path. When a legacy battery pack is used that does not conform to the present disclosure, the battery FET may be switched into the power path and perform its traditional current sense and circuit protection duties. In instances where the battery FET is switched out of the power path, power savings is effectuated by not having the series resistance of the battery FET in the power path. In a second exemplary aspect, the battery FET is eliminated entirely from the PMIC 204. Elimination of the battery FET in this fashion not only saves power by eliminating the series resistance of the battery FET from the power path, but also saves space and reduces cost in making the PMIC 204.

Figure 3:
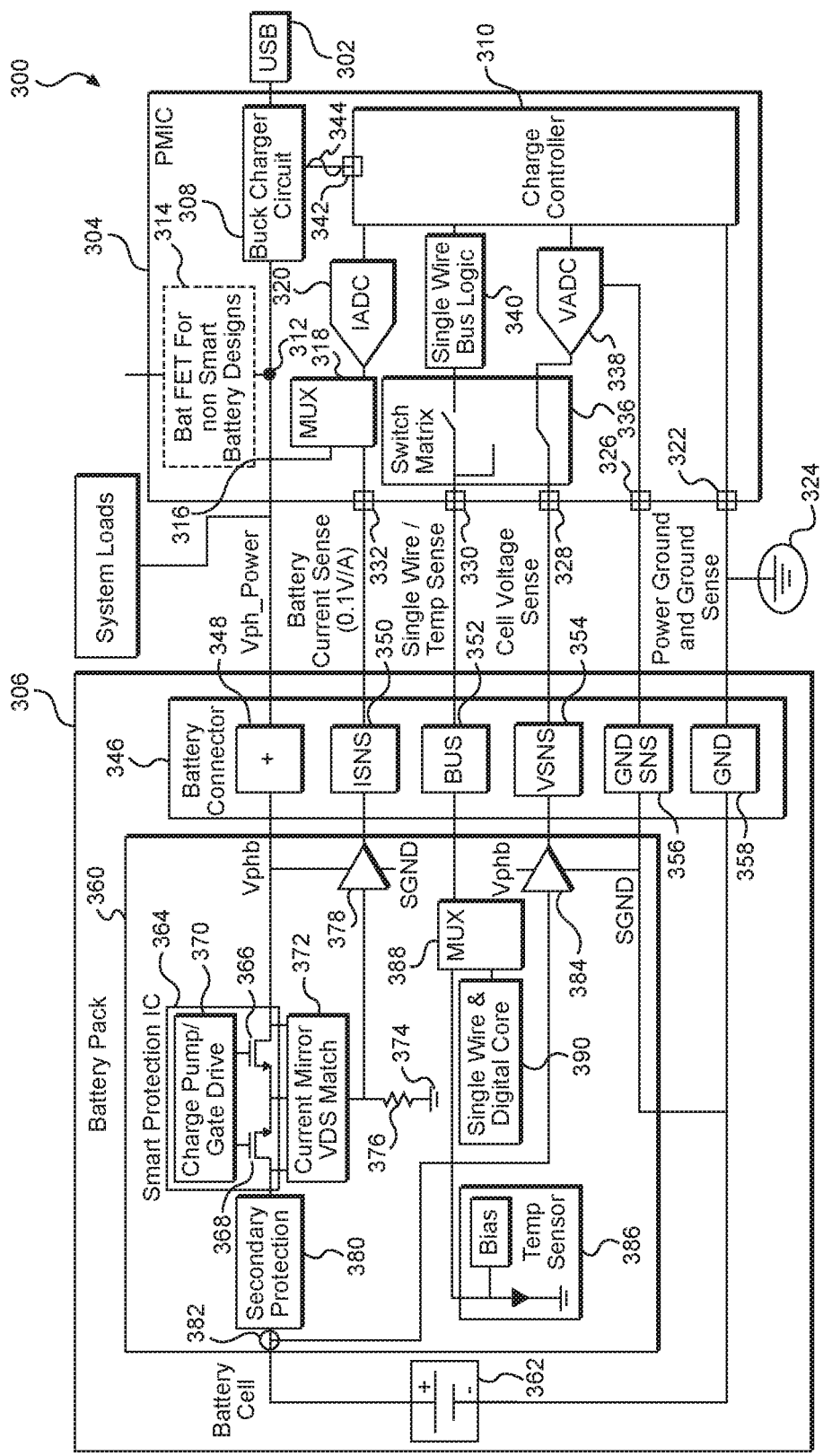
FIG. 3 is a block diagram of an exemplary analog current and voltage sensing system in a battery pack that can be used to provide information to a controller in a power management integrated circuit (PMIC)
Figure 4:
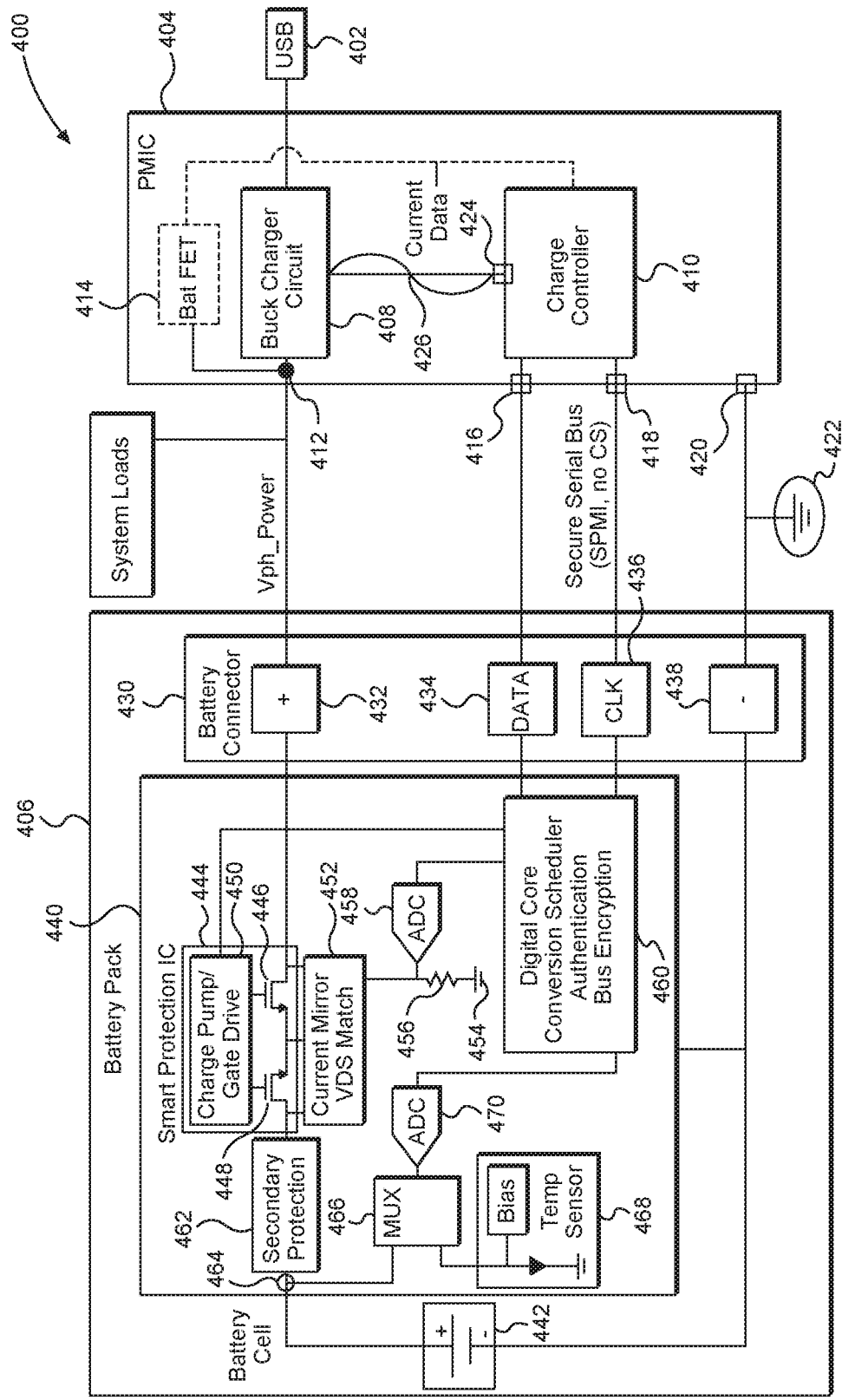
FIG. 4 is a block diagram of an exemplary digital current and voltage sensing system in a battery pack that can be used to provide information in a PMIC.

In this regard, exemplary aspects of the present disclosure can be provided in an analog implementation, illustrated in greater detail in FIG. 3 or a digital implementation, illustrated in greater detail in FIG. 4. Thus, FIG. 3 illustrates an analog power circuit 300 including a power input 302, a PMIC 304, and a battery pack 306. The power input 302 may be a USB power pin or other power source from a wall outlet, other computing device, or the like. The power input 302 provides this power to the PMIC 304 and, in particular, to a buck charger circuit 308, which is controlled by a charge controller 310. While illustrated and described as a buck charger circuit, it should be appreciated that a buck boost charger circuit or a boost charger circuit could be used in place of a buck charger circuit.

The buck charger circuit 308 steps down the voltage from the power input 302 to a desired level and outputs a desired voltage level at power node 312. An optional battery FET 314 may be switchably associated with the power node 312. If the battery FET 314 is present and active, it may be used both as a protection circuit and as a current sense circuit. In the event that the PMIC 304 is used with a legacy battery pack, the battery FET 314 may be used in both capacities. A current sense output 316 is provided to a multiplexer (MUX) 318. The output of the MUX 318 is provided to a current analog to digital converter (ADC) 320 to convert an analog value of the current sense output 316 to a digital value, which is then provided the to the charge controller 310. The charge controller 310 also is coupled to a ground pin 322, which is coupled to an electrical ground 324. The PMIC 304 further includes a voltage ground pin 326, a cell voltage pin 328, a temperature sense pin 330, and a current sense pin 332.

With continued reference to FIG. 3, the current sense pin 332 is configured to receive a battery current value from the battery pack 306. The battery current value is passed to the MUX 318. Depending on whether the battery FET 314 is active, the MUX 318 passes the current sensed at the battery FET 314 or the battery current value to the charge controller 210 through the ADC 320. The PMIC 304 further includes a switch matrix 336. The switch matrix 336 is coupled to the temperature sense pin 330 and the cell voltage pin 328. The switch matrix 336 switchably couples the cell voltage pin 328 to a voltage ADC 338. The voltage ADC 338 is also coupled to the voltage ground pin 326 and outputs a digital voltage signal to the charge controller 310. The switch matrix 336 is also configured to switchably couple the temperature sense pin 330 to a single-wire bus logic 340, which in turn is coupled to the charge controller 310.

With continued reference to FIG. 3, the charge controller 310 uses temperature information from the temperature sense pin 330, voltage from the cell voltage pin 328, and current from either the battery FET 314 or the current sense pin 332 to determine if the buck charger circuit 308 is providing a desired voltage to the battery pack 306. Accordingly, the charge controller 310 includes a control output 342 that provides a control signal 344 to the buck charger circuit 308. By allowing the removal of the battery FET 314 from the power path between the power input 302 and the battery pack 306, the serial resistance of the power path is substantially lowered, resulting in more power being delivered to the battery pack 306, which in turn results in faster charging and less heat generation. Still further, if the battery FET 314 is omitted entirely, then the space that would otherwise be allocated to the battery FET 314 is preserved, resulting in a less costly and smaller PMIC.

To get the signals relating to the current, voltage, and temperature, the battery pack 306 may include circuitry to sense such information and a battery connector 346 that is configured to output such information. The battery connector 346 includes a power input pin 348, a current sense output pin 350, a temperature sense output pin 352, a voltage sense output pin 354, a voltage ground pin 356, and a ground pin 358. The ground pin 358 is coupled to the electrical ground 324. The voltage ground pin 356 is coupled to the voltage ground pin 326. The voltage sense output pin 354 is coupled to the cell voltage pin 328. The temperature sense output pin 352 is coupled to the temperature sense pin 330. The current sense output pin 350 is coupled to the current sense pin 332, and the power input pin 348 is coupled to the output of the buck charger circuit 308 within the PMIC 304. The battery pack 306 further includes a smart protection circuit 360 and a battery cell 362. The smart protection circuit 360 includes a first protection circuit 364 that includes a first FET 366 and a second FET 368 arranged in a back-to-back configuration. As used herein, back-to-back means that the drains of the two FETs are tied together. The two FETs 366 and 368 are coupled to a charge pump/gate drive circuit 370 to form the first protection circuit 364. The first protection circuit 364 is generally conventional. Exemplary aspects of the present disclosure add a current mirror 372 to the back-to-back FETs 366 and 368 to derive information about the current flowing through the first protection circuit 364 to the battery cell 362. The current mirror 372 is coupled to an internal ground 374 through a grounding resistor 376 and also to an amplifier 378, which amplifies the information about the current before passing the amplified information to the current sense output pin 350. The amplifier 378 may also be coupled to the power input pin 348 to provide power to the amplifier 378.

With continued reference to FIG. 3, the smart protection circuit 360 further includes a second protection circuit 380 positioned between the first protection circuit 364 and the battery cell 362. A voltage sense tap 382 is associated with the node between the second protection circuit 380 and the battery cell 362. The voltage sense tap 382 provides information or data about the voltage level being provided to the battery cell 362 to an amplifier 384, which is coupled to the voltage sense output pin 354. The amplifier 384 is also coupled to the power input pin 348 to provide power to the amplifier 384. The negative terminal of the battery cell 362 is coupled to the ground pin 358 and also to the voltage ground pin 356. The voltage ground pin 356 is further coupled to the amplifiers 378 and 384. A temperature sensor 386 is provided in the smart protection circuit 360. The temperature sensor 386 is coupled to a MUX 388, which in turn is coupled to the temperature sense output pin 352. The MUX 388 is also coupled to a digital core module 390.

By providing the current mirror 372 and the voltage sense tap 382 as well as passing information and/or data gathered by the current mirror 372 and the voltage sense tap 382 to the battery connector 346, the battery pack 306 is able to provide feedback information to the PMIC 304 such that the charge controller 310 can control the buck charger circuit 308 to the desired levels.

Analog implementations such as those illustrated in FIG. 3 may be easier to introduce to the industry as more easily backwards compatible, especially if the optional battery FET 314 is present. However, such analog implementations require additional pins for both the PMIC 304 and the battery pack 306. Currently there is pressure to maximize the size of the power input pin 348 on the battery pack 306 so that it provides the least amount of resistance and allows for the greatest current flow. Accordingly, additional pins may require a compromise in the design as the additional pins may use space that would otherwise be allocated to the power input pin 348. Still further, wire routing decisions for conductors extending from the battery connector 346 to the PMIC 304 may require additional design compromises.

FIG. 4 illustrates a digital power circuit 400. The digital power circuit 400 includes a power input 402, a PMIC 404, and a battery pack 406. The power input 402 may be a power line from a USB connector or the like as previously discussed. The power input 402 provides this power to the PMIC 404 and, in particular, to a buck charger circuit 408, which is controlled by a charge controller 410. As noted above, while illustrated and described as a buck charger circuit, it should be appreciated that a buck boost charger circuit or a boost charger circuit could be used in place of a buck charger circuit.

The buck charger circuit 408 steps down the voltage from the power input 402 to a desired level and outputs a desired voltage level at power node 412. An optional battery FET 414 may be switchably associated with the power node 412. If the battery FET 414 is present and active, it may be used both as a protection circuit and as a current sense circuit. In the event that the PMIC 404 is used with a legacy battery pack, the battery FET 414 may be used in both capacities. While not illustrated in FIG. 4, a current sense output may be provided to a MUX. The output of the MUX is provided to a current ADC to convert the analog value of the current sense output to a digital value, which is then provided the to the charge controller 410. The circuitry that enables such provision of current information from the battery FET 414 to the charge controller 410 may be substantially the same as that illustrated in FIG. 3. The PMIC 404 further includes a data pin 416, a clock pin 418, and a ground pin 420 that is coupled to a ground 422.

With continued reference to FIG. 4, the data pin 416 is configured to receive multiplexed digital information in a data signal from the battery pack 406. Likewise, the clock pin 418 is configured to receive a clock signal. Both the multiplexed data signal and the clock signal are provided to the charge controller 410, which demultiplexes data in the data signal (which may use the clock signal) and uses the data so received to control the buck charger circuit 408. In particular, current information and voltage information are provided in the data signal. Optionally, temperature data and other data may be included in the data signal.

As with the charge controller 310 of FIG. 3, the charge controller 410 uses the temperature data, the voltage information, and the current information from either the battery FET 414 or the data signal to determine if the buck charger circuit 408 is providing a desired voltage to the battery pack 406. Accordingly, the charge controller 410 includes a control output 424 that provides a control signal 426 to the buck charger circuit 408. By allowing the removal of the battery FET 414 from the power path between the power input 402 and the battery pack 406, the serial resistance of the power path is substantially lowered, resulting in more power being delivered to the battery pack 406, which in turn results in faster charging and less heat generation. Still further, if the battery FET 414 is omitted entirely, then the space that would otherwise be allocated to the battery FET 414 is preserved, resulting in a less costly and smaller PMIC.

To get the signals relating to the current, voltage, and temperature, the battery pack 406 may include circuitry to sense such information and a battery connector 430 that is configured to output such information. The battery connector 430 includes a power input pin 432, a data output pin 434, a clock output pin 436, and a ground pin 438. The ground pin 438 is coupled to the ground 422. The data output pin 434 is coupled to the data pin 416, and the clock output pin 436 is coupled to the clock pin 418. The power input pin 432 is coupled to the output of the buck charger circuit 408 within the PMIC 404. The battery pack 406 further includes a smart protection circuit 440 and a battery cell 442. The smart protection circuit 440 includes a first protection circuit 444 that includes a first FET 446 and a second FET 448 arranged in a back-to-back configuration. The two FETs 446 and 448 are coupled to a charge pump/gate drive circuit 450 to form the first protection circuit 444. The first protection circuit 444 is generally conventional. Exemplary aspects of the present disclosure add a current mirror 452 to the back-to-back FETs 446 and 448 to derive information about the current flowing through the first protection circuit 444 to the battery cell 442. The current mirror 452 is coupled to an internal ground 454 through a grounding resistor 456 and also to an ADC 458, which converts the analog information from the current mirror 452 to digital current information and provides the digital current information to a digital core module 460.

With continued reference to FIG. 4, the smart protection circuit 440 further includes a second protection circuit 462 positioned between the first protection circuit 444 and the battery cell 442. A voltage sense tap 464 is associated with the node between the second protection circuit 462 and the battery cell 442. The voltage sense tap 464 provides information or data about the voltage level being provided to the battery cell 442 to a MUX 466. The MUX 466 is also coupled to a temperature sensor 468. The output of the MUX 466 is provided to an ADC 470, which converts the analog values from the voltage sense tap 464 and the temperature sensor 468 into digital information, which is provided to the digital core module 460. The digital core module 460 generates the clock signal and the data signal for transmission to the PMIC 404 through the battery connector 430, and particularly through the data output pin 434 and the clock output pin 436. The digital core module 460 may use time division multiplexing or some other multiplexing process along with authentication, encryption, or the like as part of the transmission process.

By providing the current mirror 452 and the voltage sense tap 464 as well as passing the information and/or data gathered by the current mirror 452 and the voltage sense tap 464 to the battery connector 430, the battery pack 406 is able to provide feedback information to the PMIC 404 such that the charge controller 410 can control the buck charger circuit 408 to the desired levels.

Figure 5:
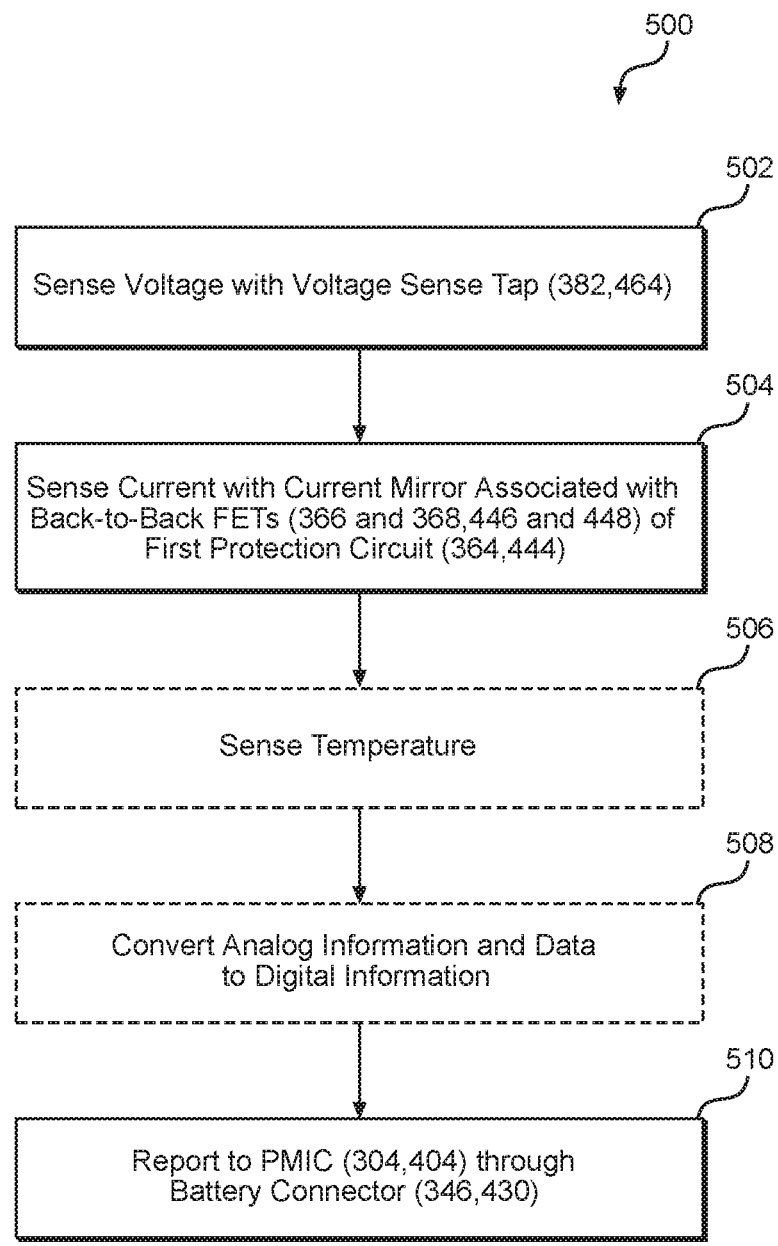
FIG. 5 is a flowchart illustrating an exemplary process for sensing voltage and current in a battery pack and providing such information to a controller in a PMIC.

Against the backdrop of the structures provided in FIGS. 3 and 4, FIG. 5 provides a flowchart of process 500 for reuse of the circuitry in the battery pack. In this regard, the process 500 includes sensing the voltage with the voltage sense tap 382 or 464 (block 502). Further, the process 500 includes sensing the current with the current mirror 372 or 452 associated with the back-to-back FETs 366 and 368 or 446 and 448 of the first protection circuit 364 or 444 (block 504). It should be appreciated that voltage and current sensing may be done effectively simultaneously or may be sampled as needed or desired. The process 500 may optionally include sensing the temperature of the battery pack 306 or 406 (block 506).

With continued reference to FIG. 5, the process 500 may, once the information and data from the sensors is collected, convert analog information and data to digital information (block 508). While not specifically illustrated, the digital information may be multiplexed into a single data stream. The information is then reported to the PMIC 304 or 404 through the battery connector 346 or 430 (block 510). While not illustrated in FIG. 5, even if the analog information and data is sent through the battery connector 346 or 430, an ADC, such as the ADC 320 or 338, within the PMIC 304 or 404 may then convert the analog information and data to a digital format before provision to the charge controller 310 or 410.

It should be appreciated that there is a process ongoing at the PMIC as well. In particular, the PMIC receives the voltage and current information from the battery connector of the battery pack and uses that that data to control the buck charger circuit. As alluded to above, the data and information may be received as a multiplexed digital data signal or as separate data from separate pins.

In exemplary aspects, the charge controller of the PMIC receives actual current levels and voltage levels. That is, the information and data received from the voltage tap sensor and the current mirror are, in fact, the voltage level and the current level. In other exemplary aspects, the information and data received are indicative of or representative of the voltage level and the current level. For example, a look-up table could be used to assign arbitrary values to specific current and/or voltage levels. The look-up table could consolidate both current values and voltage values into a single arbitrary number or provide two distinct numbers. Still further, instead of the actual voltage and the actual current, the charge controller could receive information and or data proportional to the actual values. Regardless of the specific values received, the charge controller is able to determine the current levels and the voltage levels and adjust the buck charger circuit accordingly to provide the desired charging to the battery cell.

The systems and methods for reuse of battery pack-side current and voltage sensing according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
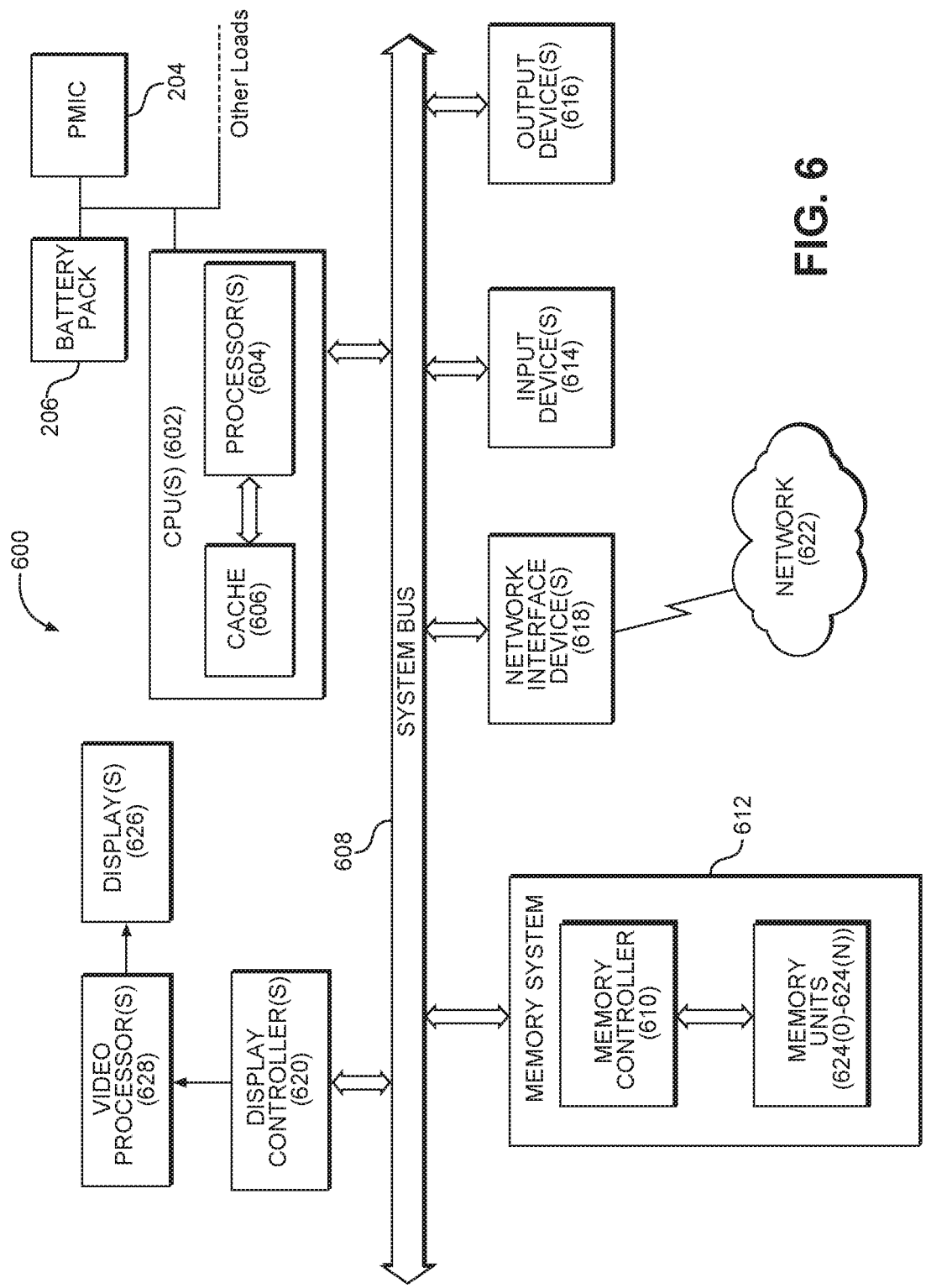
FIG. 6 is a block diagram of an exemplary processor-based system that can include the battery pack and PMIC of FIGS. 3 and 4.

In this regard, FIG. 6 illustrates an example of a processor-based system 600 that can employ the battery pack 206 and the PMIC 204 illustrated in FIG. 2. In this example, the processor-based system 600 receives power from the battery pack includes one or more central processing units (CPUs) 602, each including one or more processors 604. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device. Although not illustrated in FIG. 6, multiple system buses 608 could be provided, wherein each system bus 608 constitutes a different fabric.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624 (0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A battery pack comprising:
 a battery cell;
 a protection circuit comprising a first field effect transistor (FET) and a second FET arranged back-to-back;
 a current mirror directly coupled to a source of the first FET and a source of the second FET, the current mirror configured to provide information about current flowing to the battery cell;
 a voltage sense circuit; and
 a battery connector configured to couple to a power bus and convey information from the voltage sense circuit and the information about the current flowing to the battery cell to a remote power management integrated circuit (PMIC) across the power bus.

2. The battery pack of claim 1, wherein the battery connector comprises a current sense pin configured to convey the information about the current flowing to the battery cell to the remote PMIC.

3. The battery pack of claim 1, wherein the battery connector comprises a voltage sense pin configured to convey the information from the voltage sense circuit to the remote PMIC.

4. The battery pack of claim 1, further comprising:
 a second protection circuit positioned between the second FET and the battery cell;
 a voltage sense tap positioned between the second protection circuit and the battery cell; and
 a voltage signal amplifier coupled to the voltage sense tap and the battery connector.

5. The battery pack of claim 1, wherein the battery connector comprises a data pin and further comprising a digital core module coupled to the battery connector and configured to multiplex the information from the voltage sense circuit and the information about the current flowing to the battery cell onto the data pin.

6. The battery pack of claim 5, further comprising a current analog to digital converter (ADC) configured to convert an output from the current mirror to a digital current signal for the digital core module.

7. The battery pack of claim 5, further comprising a voltage sense tap and a voltage analog to digital converter (ADC) configured to convert voltage sensed at the voltage sense tap to a digital voltage signal for the digital core module.

8. The battery pack of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A method for controlling battery charging, comprising:
 sensing current within a battery pack comprising a battery cell using a current mirror, the current mirror directly coupled to a source of a first field effect transistor (FET) and a source of a second FET in the battery pack;
 sensing voltage within the battery pack; and
 reporting information related to the current and the voltage to a separate power management integrated circuit (PMIC).

10. The method of claim 9, further comprising converting analog information about the current and the voltage to digital information prior to reporting.

11. The method of claim 9, wherein the reporting comprises using a separate voltage pin and a current pin.

12. The method of claim 9, wherein sensing the voltage comprises using a voltage tap between a protection circuit and the battery cell.

13. The method of claim 9, further comprising sensing temperature within the battery pack and reporting a sensed temperature to the separate PMIC.

* * * * *